US005407453A

United States Patent [19]

Pierce-Ruhland et al.

[11] Patent Number: 5,407,453

[45] Date of Patent: Apr. 18, 1995

[54] DEPOSIT CLEANING COMPOSITION FOR INTERNAL COMBUSTION ENGINES

[75] Inventors: G. Frederick Pierce-Ruhland, Kingsville; Stephen H. Stoldt, Concord Township, both of Ohio

[73] Assignee: The Lubrizol Corporation, Wickliffe, Ohio

[21] Appl. No.: 35,137

[22] Filed: Mar. 19, 1993

[51] Int. Cl.$^6$ .......................... C01L 1/22; C11D 1/68; C11D 3/30/3/18

[52] U.S. Cl. .......................................... 44/411; 44/433; 44/302; 252/544; 252/548

[58] Field of Search .......................... 44/411, 433, 302; 252/544, 548

[56] References Cited

U.S. PATENT DOCUMENTS

| | | | |
|---|---|---|---|
| 2,952,637 | 9/1960 | Bray et al. | 252/118 |
| 3,497,333 | 2/1970 | Thayer | 44/433 |
| 3,755,433 | 8/1973 | Miller et al. | 252/51.5 R |
| 3,869,514 | 3/1975 | Miller et al. | 564/503 |
| 3,876,704 | 4/1975 | Nakaguchi | 260/584 R |
| 3,980,450 | 9/1976 | Battersby et al. | 44/433 |
| 4,055,402 | 10/1977 | Battersby et al. | 44/72 |
| 4,985,047 | 1/1991 | Surg et al. | 44/433 |

*Primary Examiner*—Paul Lieberman
*Assistant Examiner*—Erin Higgins
*Attorney, Agent, or Firm*—John H. Engelmann; Frederick D. Hunter, Sr.; David M. Shold

[57] ABSTRACT

It has been found that a composition comprising an alkoxy alcohol, an aliphatic alcohol, a liquid petroleum distillate, a liquid fatty acid, a volatile nitrogen base, polyisobutenyl aminoethylethanolamine, and water may be used as an engine deposit cleaner which removes air and fuel induction system deposits, valve deposits, and combustion chamber deposits. The inventive composition may be introduced into the engine in lieu of fuel, or in conjunction with fuel while the engine is operating.

11 Claims, No Drawings

DEPOSIT CLEANING COMPOSITION FOR INTERNAL COMBUSTION ENGINES

This invention relates to water-based compositions for cleaning the air and fuel induction systems, valves, and combustion chambers of gasoline internal combustion engines. The composition comprises an alkoxy alcohol, an aliphatic alcohol, a petroleum distillate, a liquid fatty acid, a volatile nitrogen base, polyisobutenyl aminoethylethanolamine, and water.

BACKGROUND OF THE INVENTION

It has been found that the fuel induction system, valves, and combustion chambers of internal combustion engines develop deposits which are derived from many sources, including materials in the fuel, products of fuel decomposition, products of fuel combustion, contaminants in the air which are not removed by filtration, and lubricating oil residues. Such deposits lead to poor distribution of the fuel charge in the cylinder, inappropriate quantities of fuel in the various cylinders, and other problems which lead to poor engine performance, increased emissions, and poor fuel economy.

Accordingly, it is an object of this invention to provide cleaning compositions which will both remove fuel induction system deposits, as well remove deposits from the valves and combustion chambers. The compositions are not intended to be used in the fuel itself, but are intended to be used as a single cleaning treatment of the engine.

U.S. Pat. No. 2,952,637 discloses a carburetor and engine cleaning composition containing an alkoxy alcohol, an aliphatic alcohol, a petroleum distillate, a liquid fatty acid, a volatile nitrogen base and water. As shown in Example 4, this composition does not provide adequate cleaning in a test designed to simulate cleaning of valve deposits. In the U.S. Pat. No. 2,952,637, the volatility of the nitrogen base is important to the invention. Hydroxyalkylamines, such as ethanolamines, are to be avoided because of their low volatility and their tendency to cause sludge to deposit in the ring grooves of the piston.

U.S. Pat. No. 3,876,704 discloses that N-long chain alkyl, N-hydroxyalkyl alkylenepolyamines are useful as detergents in hydrocarbon fuels.

U.S. Pat. No. 4,055,402 discloses that polyisobutenyl aminoethylethanolamine is useful as a gasoline detergent at levels from 50 to 200 parts per million.

SUMMARY OF THE INVENTION

Surprisingly, it has now been found that a composition comprising:

| | Percent by Weight |
|---|---|
| Alkoxy alcohol containing 2-5 carbon atoms in the alkyl group | 1-6 |
| Aliphatic alcohol having 4-6 carbon atoms | 1-6 |
| Liquid Petroleum distillate | 47-98 |
| Liquid fatty acid of 12-20 carbon atoms | 1-6 |
| Polyisobutenyl aminoethylethanolamine | .02-5 |
| Water | 5-30 |
| and volatile nitrogen base selected from the class consisting of ammonia, or an organic amine in sufficient quantity to neutralize the liquid fatty acid | |

may be used as a cleaner for gasoline internal combustion engines to clean air and fuel induction systems, valves, and combustion chambers of such engines. The compositions may also be used in the form of a concentrate.

DETAILED DESCRIPTION OF THE INVENTION

It has been found that a composition comprising an alkoxy alcohol, an aliphatic alcohol, a liquid petroleum distillate, a liquid fatty acid, a volatile nitrogen base, polyisobutenyl aminoethylethanolamine, and water may be used as an engine deposit cleaner which removes air and fuel induction system deposits, valve deposits, and combustion chamber deposits. As set forth more fully below, the inventive composition may be introduced into the engine in lieu of fuel, or in conjunction with fuel while the engine is operating. The operation of the engine in this manner results in a significant cleaning of the air and fuel induction systems, the valves, and the combustion chambers.

Alkoxy Alcohols

The alkoxy alcohols useful in the present invention are ether alcohols in which the alkyl group has from two to five carbon atoms. Examples are ethyl hydroxyethyl ether (ethyl Cellosolve); ethoxy ethoxy ethyl alcohol (ethyl Carbitol); butoxy ethoxy ethyl alcohol (butyl Carbitol); propoxy propyl alcohol and hydroxy ethyl amyl ether. They may contain more than one ether oxygen and usually two or three carbon atoms in the alcohol group. Butyl Cellosolve (butyl hydroxyethyl ether) has been found to be very satisfactory.

Aliphatic Alcohols

A wide variety of 4 to 6 carbon aliphatic alcohols may be used in the inventive composition. These alcohols all possess some degree of oil solubility as well as some degree of water solubility. Thus, the alcohols serve well in a composition which includes both petroleum distillates, as well as water. These alcohols include normal, secondary and tertiary butyl alcohols, as well as the isomeric pentanols and hexanols. Methyl iso-propyl carbinol has been found to provide particularly good results.

Liquid Petroleum Distillates

A wide variety of liquid petroleum distillates may be used in preparing the inventive compositions. The liquid petroleum distillates usable in the present invention should boil in the gasoline range or above, and should be liquid at room temperature (approximately 68° F.). Specifications for automotive gasoline, including boiling ranges, are fully defined in ASTM Standard D 439-89 (recently replaced by D 4814-91). Liquid petroleum distillates with boiling ranges higher than those of gasoline may be used, and the distillate may be aliphatic, including straight chain and cyclic hydrocarbons, aromatic, or be a mixture of aliphatic and aromatic substances. The liquid petroleum distillate may be a high flash naphtha, kerosene, olefin polymer, or an aromatic solvent such as xylene or an aromatic petroleum naphtha rich in xylenes, alkyl naphthalenes, etc., such as the solvent extracts from petroleum distillates and the product known as "hydroformer bottoms"—the fraction from the reforming process boiling above gasoline.

The use of aromatic hydrocarbons increases the solvency of the cleaner for varnishes and gums found in the induction system of the engine. Aromatic naphthas having a boiling point near that of xylene or above are preferred. These materials may be coal tar distillates containing xylene; however, aromatic naphthas of petroleum origin are preferred because of their low cost. These are usually derived from solvent extracts or from hydroformer or aromatizer distillates. For most purposes, where odor is not important, it is preferred to use aromatic distillates of upwards of 50% aromatic content having a flash point above about 110° F. (closed cup) and initial boiling point above about 300° F. Two examples of aromatic naphthas suitable for this purpose had the following characteristics:

| | Sample 1 | Sample 2 |
|---|---|---|
| Gravity, °API | 30.5 | 36.7 |
| Flash Point (cc), °F. | 138 | 110 |
| Aniline Point, °F. | 9 | 31 |
| Percent Aromatic hydrocarbons | 72 | 57 |
| Distillation: | | |
| Initial point | 350 | 320 |
| 10% | 360 | 324 |
| 50% | 373 | 330 |
| 90% | 396 | 342 |
| End Point | 415 | 378 |

The odor of aromatic petroleum solvents can be improved by a mild treatment with sulfuric acid, for example, 10 pounds per barrel. Thus, an aromatic distillate boiling in the range of 440° to 590° F. was so treated and neutralized before using in the above formulas. It is preferred that the liquid petroleum distillate contain a small quantity of lubricating oil. One purpose of this oil is to leave a non-volatile film of oil on exposed metal surfaces in the engine, thereby providing lubrication and preventing rust. The oil also helps in the cleaning process and prevents valve sticking.

When a light lubricating oil is employed in our composition, it is preferably a pale oil having a viscosity within the range of about 60 to 800 SUS at 100° F. This may be obtained from any ordinary crude but lubricating distillates from naphthenic or aromatic base crudes are preferred. Heavy lubricating oils can be used in small amounts, however. Such oils may have a viscosity of up to 2500 SUS at 100° F. Synthetic oils may be substituted for actual distillate oil within the composition. The light and heavy oils should make up between about 0.02 to 6% of the final composition.

Liquid Fatty Acids

A wide variety of liquid fatty acids may be used in the present invention. For example, red oil of commerce (a mixture of about 70% oleic acid and 15% each of stearic and linoleic acids) or other liquid fatty acids such as fish oil fatty acid, soy bean fatty acid, tall oil fatty acid, corn oil fatty acid, linseed oil fatty acid, cottonseed fatty acid, coconut fatty acid, rapeseed fatty acid, and naphthenic acid may be used. Other carboxylic acids of low melting point, below about 35° C. usually having about 12 to 20 carbon atoms are also useful.

Volatile Nitrogen Base

The volatile nitrogen base can be gaseous or liquid ammonia. When ammonia is used, aqueous ammonia (28% $NH_3$) is preferred. The base may be an organic amine such as methylamine, dimethylamine, ethylamine, butylamine, morpholine, trimethylamine, diethylamine, triethylamine, propylamine, dipropylamine, etc. The amines which are gases at room temperature may be used in the form of their water solutions. Clarity of the final composition is easier to achieve if the alkyl group on the amine is not too large. Amines containing from 1 to about 6 carbon atoms combined in the alkyl groups attached to the nitrogen atom are usable. The amount of the nitrogen base should be sufficient to approximately neutralize the liquid fatty acid employed. Preferably, the molar amount of the amine is between 85 and 115% of the molar amount of the fatty acid.

Polyisobutenyl Aminoethylethanolamine

The polyisobutenyl aminoethylethanolamine, which is to be employed in preparing the composition of the present invention, is prepared by reacting polyisobutylene with chlorine, and then reacting the chlorinated material with aminoethylethanolamine. The polyisobutylene has an Mn (number average molecular weight) value of from about 500 to about 1500 and a Mw/Mn value of 1.3–4. Both Mn and Mw may be determined by gel permeation chromatography. A suitable method is described in U.S. Pat. No. 4,234,435 (columns 7–8). Chlorination of the polyisobutylene is well known, and involves merely contacting the polyalkene with chlorine gas until the desired amount of chlorine is incorporated into the chlorinated polyisobutene. The chlorination reaction is generally carried out at a temperature of about 75° C. to about 125° C. If a diluent is used in the chlorination procedure, it could be one which is not itself readily subject to further chlorination. Poly and perchlorinated and/or fluorinated 10 alkenes and benzenes are examples of suitable diluents. Unhalogenated saturated aliphatic hydrocarbons, as well as aromatic hydrocarbons may be suitable diluents provided that the conditions of the reaction are maintained so as to avoid their halogenation.

The reaction of chlorinated polyisobutylene with aminoethylethanolamine is likewise well known. The chlorinated polyisobutylene and the aminoethylethanolamine are heated together in the presence of a base such as sodium carbonate or sodium hydroxide. Examples of suitable preparations are given in U.S. Pat. Nos. 3,755,433 and 4,055,402.

Other Ingredients

In order to enhance the rust protection offered by the use of the inventive composition, a small amount of an alkali or alkaline earth metal petroleum sulfonate may be added to the composition. Preferably, the final composition contains about 0.3 to about 1.5 percent of akali or alkaline earth metal petroleum sulfonate. This sulfonate may be added in the form of a solution of the sulfonate in oil.

The petroleum sulfonate employed in the composition is the preferentially oil soluble type sulfonate obtained by the action of fuming sulfuric acid on petroleum lubricating oils or aromatic alkylates usually within the range of about 100 to 550 SUS viscosity at 100° F. Such sulfonates have occasionally been referred to a mahogany sulfonates. The resulting sulfonic acid, after purification to remove inorganic salts is usually concentrated in the oil phase and converted to alkali or alkaline earth metal sulfonate.

Methods of Mixing the Compositions

In making up these compositions, the ingredients may be combined in several ways. Thus, the volatile base and the fatty acid can be combined to form a soap which is then mixed with the water, alkoxy alcohol, and aliphatic alcohol. The petroleum sulfonate and the polyisobutenyl aminoethylethanolamine may be dissolved in the light lubricating oil which may be slightly heated to accelerate the solution. This solution can then be diluted with the petroleum distillate and finally combined with the soap mixture.

It is sometimes convenient, in commercial practice, to first mix all the ingredients except the volatile base, for example, ammonia, which is added last with thorough mixing. Agitation in a tank with air or by mechanical means for a period of 15 to 30 minutes is usually sufficient. Part of the mineral lubricating oil can be withheld to follow the addition of volatile base to insure complete addition of the latter when pumping through a line. The product is a clear, stable solution which can be kept in closed containers indefinitely without separation. Inasmuch as the water and petroleum distillate are present in the composition, the product has a powerful wetting and penetrating action for either oil-wet or water-wet surfaces which enables the liquid to loosen deposits from surfaces where they are accumulated.

Use of the compositions

The compositions are intended for use in an engine cleaning procedure. The procedure involves supplying the compositions to the engine as fuel, and operating the engine. The compositions may be used either as a substitute for fuel or in conjunction with fuel from the standard fuel source for the engine. To this end the compositions may be provided in the form of a concentrate, and in the form of a fully diluted composition. The concentrate contains most of the ingredients of the diluted composition, and may be converted into the diluted composition by the addition of sufficient gasoline so that the diluted mixture is approximately 50 percent gasoline. The concentrate is not a good fuel, and an engine will not run well if the concentrate is substituted for fuel. However, it may be used in conjunction with the regular fuel. In order to operate the engine in this manner, the regular fuel supply is left connected and the engine is run. The concentrate is inducted into the mixture of the fuel and the air by some suitable means, depending upon the structure of the engine. For example, in a carburetor equipped engine, the concentrate could be introduced into the engine with the air moving through the air horn. The diluted composition could also be used in this manner. The concentrate typically has the following composition:

| | Percent by Weight |
|---|---|
| Alkoxy alcohol containing 2-5 carbon atoms in the alkyl group | 2-12 |
| Aliphatic alcohol having 4-6 carbon atoms | 2-12 |
| Liquid Petroleum distillate | 10-30 |
| Liquid fatty acid of 12-20 carbon atoms | 2-12 |
| Polyisobutenyl aminoethylethanolamine | .04-10 |
| Water | 10-60 |
| Volatile nitrogen base selected from the class consisting of ammonia, or an organic amine in sufficient quantity to neutralize the liquid fatty acid. | |

The diluted composition is prepared by adding gasoline to the concentrate. This diluted composition may be used as a substitute for fuel since it contains sufficient gasoline to function as a fuel. An engine deposit cleaning composition of the following composition may be prepared:

| | Weight Percent |
|---|---|
| Butyl Cellosolve | 2-4 |
| Methyl Isobutyl Carbinol | 2-4 |
| Liquid Petroleum Distillate | 68-79 |
| Aqueous Ammonia (28%) | 0.5-1.5 |
| Water | 11-13 |
| Oleic Acid | 2-4 |
| Calcium Petroleum Sulfonate | 0.1-0.5 |
| Polyisobutenyl aminoethylethanolamine | 1-3 |

-continued

| | Weight Percent |
|---|---|
| wherein the liquid petroleum distillate comprises | |
| Gasoline | 45-50 |
| 500 SUS Neutral Oil | 1-2 |
| 700 SUS Neutral Oil | 4-5 |
| Xylene | 10-12 |
| Mineral Spirits | 8-10 |

The exact methods of running an engine using the diluted composition as a fuel, depend on the structure of the engine. However, in overview, the normal fuel supply to the engine is disconnected, and a supply of the diluted composition is connected in its place. Such pumps and fuel metering devices as may be necessary for the particular engine would have to be supplied in some manner in order to assure normal operation of the engine. Methods of connecting fuel supplies to an engine are well known to those skilled in the art.

EXAMPLES

Example 1

A sample of a water-based port fuel injector cleaner of the type disclosed in U.S. Pat. No. 2,952,637 was prepared to form Composition 1.

| Composition 1 | Weight Percent |
|---|---|
| Butyl Cellosolve | 3.2 |
| Methyl Isobutyl Carbinol | 3.2 |
| 500 SUS Neutral Oil | 1.6 |
| 700 SUS Neutral Oil | 1.0 |
| Aqueous Ammonia (28%) | 0.79 |
| Water | 13.0 |
| Oleic Acid | 3.2 |
| Calcium Petroleum Sulfonate | 0.26 |
| Xylene | 11.6 |
| Mineral Spirits | 9.15 |
| Gasoline | 53.0 |

Example 2

A composition containing polyisobutenyl aminoethylethanolamine (24.4% in a diluent oil) dissolved in an aliphatic hydrocarbon solvent was prepared to form Composition 2.

| Composition 2 | Weight Percent |
|---|---|
| Polyisobutenyl aminoethylethanolamine (24.4% in a diluent oil) | 6.11 |
| Aliphatic Hydrocarbon Solvent | 93.89 |

Example 3

A composition was prepared containing polyisobutenyl aminoethylethanolamine (24.4% in a diluent oil) mixed with the water-based cleaning material of EXAMPLE 1 (Composition was prepared to form Composition 3.

| Composition 3 | Weight Percent |
|---|---|
| Polyisobutenyl aminoethylethanolamine (24.4% in a diluent oil) | 6.11 |

-continued

| Composition 3 | |
| --- | --- |
| | Weight Percent |
| Composition 1 | 93.89 |

Example 4

A test was run to determine the ability of compositions 1-3 to remove preformed deposits in the Southwest Research Institute Intake System Deposit bench test rig. Deposits were initially formed by spraying 100 ml of a gasoline containing no additives onto each of several aluminum cylinders heated to 300° C. A carbonaceous deposit formed which simulated the deposits found on engine intake valves. Each of the dirty cylinders was treated with 100 ml of the test composition at 300° C. to test the ability of the composition to remove pre-existing deposits.

Composition 1 gave no visible removal of deposits at 300° C. After the cylinder was cooled, it was found that 6.2 mg. of deposits remained.

Composition 2 did not provide any visible removal of deposits at 300° C. After the cylinder cooled, it was found that 6.7 mg. of deposits remained.

Composition 3 provided an 11% reduction in the apparent area of the deposit on the cylinder at 300° C. After cooling, only 3.4 mg. of deposit remained on the cylinder.

We claim:

1. An engine deposit cleaning composition for removing deposits from internal combustion engines when introduced through the injectors of said engines while operating, said composition comprising the following ingredients:

| | Percent by Weight |
| --- | --- |
| Alkoxy alcohol containing 2-5 carbon atoms in the alkoxy group and 2-3 carbon atoms in the alcohol group | 1-6 |
| Aliphatic alcohol having 4-6 carbon atoms | 1-6 |
| Liquid Petroleum distillate | 47-98 |
| Liquid fatty acid of 12-20 carbon atoms | 1-6 |
| Polyisobutenyl aminoethylethanolamine | .02-5 |
| Water | 5-30 |
| Volatile nitrogen base selected from the group consisting of ammonia, and an organic amine in sufficient quantity to approximately neutralize the liquid fatty acid. | |

2. An engine cleaning composition according to claim 1 containing in addition between 0.3 and 1.5% of an alkali or alkaline earth metal petroleum sulfonate.

3. An engine cleaning composition according to claim 1 wherein the liquid petroleum distillate contains a lubricating oil of a viscosity between 60 and 800 SUS at 100° F.

4. An engine cleaning composition according to claim 1 wherein the volatile nitrogen base is aqueous ammonia.

5. An engine cleaning composition according to claim 1 wherein the volatile nitrogen base is trimethylamine.

6. An engine cleaning composition according to claim 1 wherein the liquid fatty acid is oleic acid.

7. An engine cleaning composition according to claim 1 wherein the liquid petroleum distillate contains an aromatic naphtha.

8. An engine cleaning composition according to claim 1 wherein the alkoxy alcohol is butyl cellosolve.

9. An engine cleaning composition according to claim 1 wherein the aliphatic alcohol is methyl isobutyl carbinol.

10. An engine deposit cleaning composition for removing deposits from internal combustion engines when introduced through the injectors of said engines while operating, said composition comprising the following ingredients:

| | Percent by Weight |
| --- | --- |
| Alkoxy alcohol containing 2-5 carbon atoms in the alkoxy group and 2-3 carbon atoms in the alcohol group | 2-12 |
| Aliphatic alcohol having 4-6 carbon atoms | 2-12 |
| Liquid Petroleum distillate | 10-30 |
| Liquid fatty acid of 12-20 carbon atoms | 2-12 |
| Polyisobutenyl aminoethylethanolamine | .04-10 |
| Water | 10-60 |
| Volatile nitrogen base selected from the group consisting of ammonia, and an organic amine in sufficient quantity to approximately neutralize the liquid fatty acid. | |

11. An engine deposit cleaning composition according to claim 1 of the following composition:

| | Weight Percent |
| --- | --- |
| Butyl Cellosolve | 2-4 |
| Methyl Isobutyl Carbinol | 2-4 |
| Liquid Petroleum Distillate | 68-79 |
| Aqueous Ammonia (28%) | 0.5-1.5 |
| Water | 11-13 |
| Oleic Acid | 2-4 |
| Calcium Petroleum Sulfonate | 0.1-0.5 |
| Polyisobutenyl aminoethylethanolamine | 1-3 |
| wherein the liquid petroleum distillate comprises | |
| Gasoline | 45-50 |
| 500 SUS Neutral Oil | 1-2 |
| 700 SUS Neutral oil | 4-5 |
| Xylene | 10-12 |
| Mineral Spirits | 8-10 |

* * * * *